United States Patent [19]
Frankel

[11] 3,973,344
[45] Aug. 10, 1976

[54] MULTI-IMAGE SLIDE MOUNT

[75] Inventor: Hugh Frankel, Montreal, Canada

[73] Assignee: Multi-Slide Corporation Ltd., St. Bruno, Canada

[22] Filed: Aug. 29, 1973

[21] Appl. No.: 392,559

[52] U.S. Cl. .................. 40/158 B; 40/106.1; 353/27 R; 353/120; 355/54; 355/75
[51] Int. Cl.² .................................... G09F 1/10
[58] Field of Search ............... 355/75, 53, 54; 354/124; 353/27, 108, 120; 40/152 R, 158 R, 158 B, 106.1

[56] References Cited
UNITED STATES PATENTS

| | | | |
|---|---|---|---|
| 1,987,067 | 1/1935 | Leavitt | 355/75 |
| 2,348,457 | 5/1944 | Drehs | 354/124 |
| 2,589,680 | 3/1952 | Denny | 355/75 |
| 2,788,705 | 4/1957 | Huebner | 355/54 |
| 3,494,697 | 2/1970 | Nygaard | 355/86 |
| 3,547,531 | 12/1970 | Wells | 353/76 |

Primary Examiner—Richard M. Sheer
Attorney, Agent, or Firm—Alan Swabey & Co.

[57] ABSTRACT

A visual education system for making and viewing a multi-image film strip. The system includes a camera movable lengthwise and widthwise by a programming apparatus to expose on a film strip a plurality of discrete images; a viewing apparatus for projecting the discrete images on the film strip onto a viewing screen and a slide mount having adjacent rows of apertures therein for receiving the multi-image film strip. The slide mount includes a guide channel that cooperates with an aperture member of the viewing apparatus for projecting the discrete images on the film strip onto the viewing screen.

6 Claims, 10 Drawing Figures

MULTI-IMAGE SLIDE MOUNT

BACKGROUND OF INVENTION

1. Field of the Invention

The present invention relates to a photographic system including apparatus and method to produce and view a series of photographic images in a specific sequential pattern on a small film area. The invention also relates to a multi-image slide mount.

2. Description of Prior Art

Prior art audio visual software consists primarily of colour slides, filmstrips and overhead projection transparencies. All of these are, to varying degrees, expensive, bulky, subject to damage and the time for duplication is long and must generally be performed by outside skilled services.

Existing information retrieval systems (such as microfilm and microfiche) are primarily in the black and white print retrieval field, use many different formats and size standards, are viewed on random access equipment which must accommodate a large variety of standards making for complexity of equipment and high cost.

SUMMARY OF INVENTION

It is a feature of the present invention to provide a photographic system which reproduces from original input horizontal, vertical and square images without any cropping.

A further feature of the invention is to provide a system in which the software is economical when compared to prior art audio visual material.

A still further feature of the invention is to provide an inexpensive sequentially-programmed sound and image medium which is ideally suited for individualized self-instruction.

Another feature of the invention is to provide a system in which the unique image-mount serves the double function of protecting the software in the handling and also of programming it through a viewer.

According to a broad aspect, the present invention provides a copy camera for use in making multi-image film strips and comprising a housing for storing a photographic film. The housing is movably secured to a base member. A copy lens is provided in the base member and a shutter for interrupting an optical path is positioned between the lens and an aperture frame. Means are also provided for operating the shutter. Programming means displace the film widthwise and lengthwise of the aperture frame to expose on the film a plurality of discrete images along a portion of the width of the film and in a sequential path on the length of the film.

From another aspect, the invention provides a viewer for viewing a multi-image film secured in a slide mount having guide means thereon. The viewer comprises a viewing screen and a carrier for receiving a multi-image slide mount having a plurality of images. A light source is provided in the viewer for directing light on the slide mount. Means are further provided for projecting individual ones of the images on the screen. Programming means displace the carrier to move the images on the slide mount and coacting with the means for projecting and guide means for sequential projection of each of the images on the viewing screen.

From a further aspect, the present invention provides a multi-image slide mount comprising a plate-like body having at least two parallel rows of apertures therein. Guide means are provided on the face of the body to provide a guide channel extending sequentially about the apertures. The plate-like body is adapted to receive and secure the film strip therein for aligning images within the apertures.

From a still further aspect, the present invention provides a method of fabricating and processing a multi-image film strip.

BRIEF DESCRIPTION OF DRAWINGS

A preferred embodiment of the invention is illustrated with reference to the accompanying drawings in which.

DESCRIPTION OF PREFERRED EMBODIMENTS

Referring now to the drawings and, more particularly to FIGS. 1 to 4, there is shown the sequential programming camera 10 which is rigidly secured to a support column 11 secured vertically on a base 12. Incorporated within the base 12 are an electronic flash power pack (not shown), electrical circuits and wiring (not shown) for all camera functions as indicated on the control panel 13 and the control mechanism 14 for raising and lowering the copy stage 15.

Figure 1:
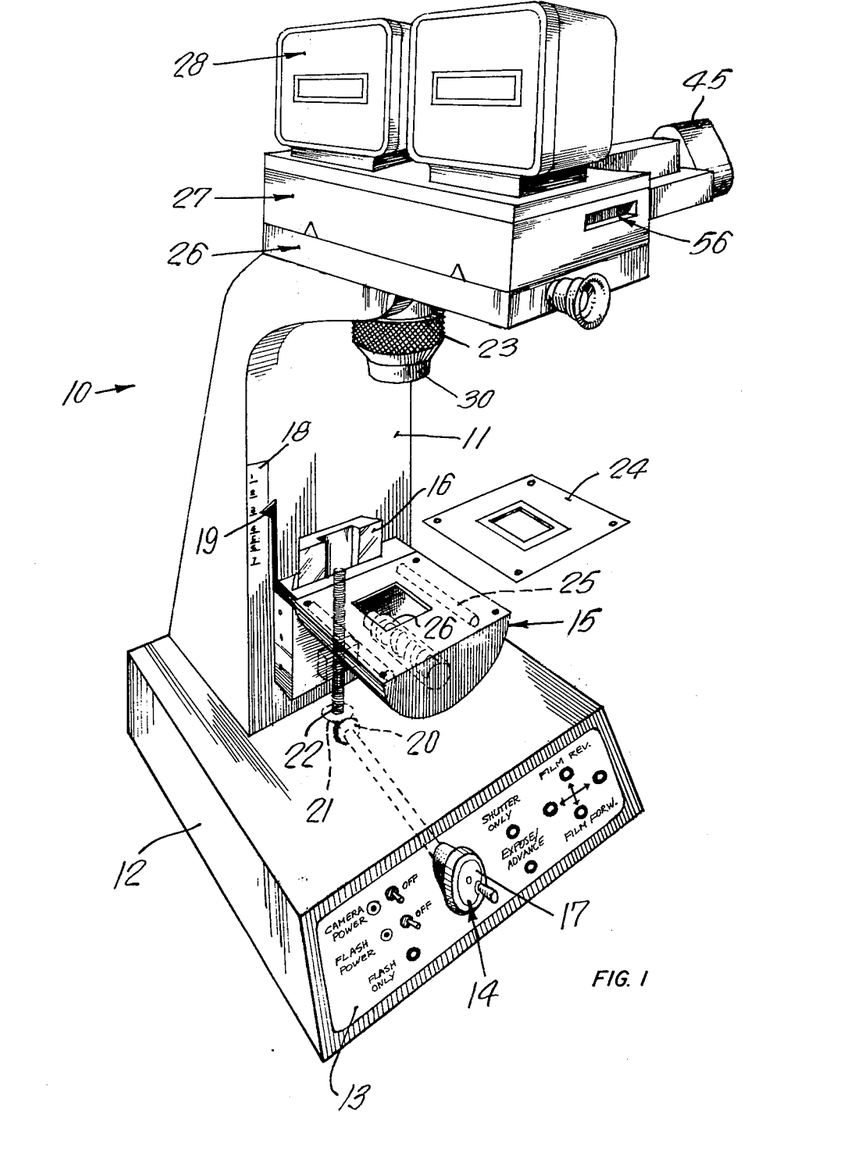
FIG. 1 is a perspective view of the sequential programming copy camera and associated support column and base.

The copy stage 15 moves up and down on the guide plate 16 and is controlled by a manually operated handwheel 17 located on the control panel 13 to change the field sizes required in order to copy photographic colour transparencies (not shown) in sizes varying from 6 × 9 cm to 16 mm single frame and all common intermediate sizes (6 × 6 cm, 24 × 36 mm, etc.). A field size indicator 18 with its pointer 19 allows the camera operator to change field sizes quickly. As shown, the handwheel 17 is connected to a gear 20 in meshing contact with a further gear 21 connected to a threaded rod 22, thus causing vertical displacement of the copy stage 15 and varying the field size between the lens housing 23 and a mask 24 on the upper face of the stage 15.

Incorporated within the copy stage 15 and directly below the field size mask 24 are two pilot lights 25 for focusing as well as a linear electronic flash tube 26 whose intensity can be varied from full to ½, ¼ and ⅛ power capacity as required by the transparencies to be copied. The control for the tube power variation is located on the control panel 13.

Figure 2:
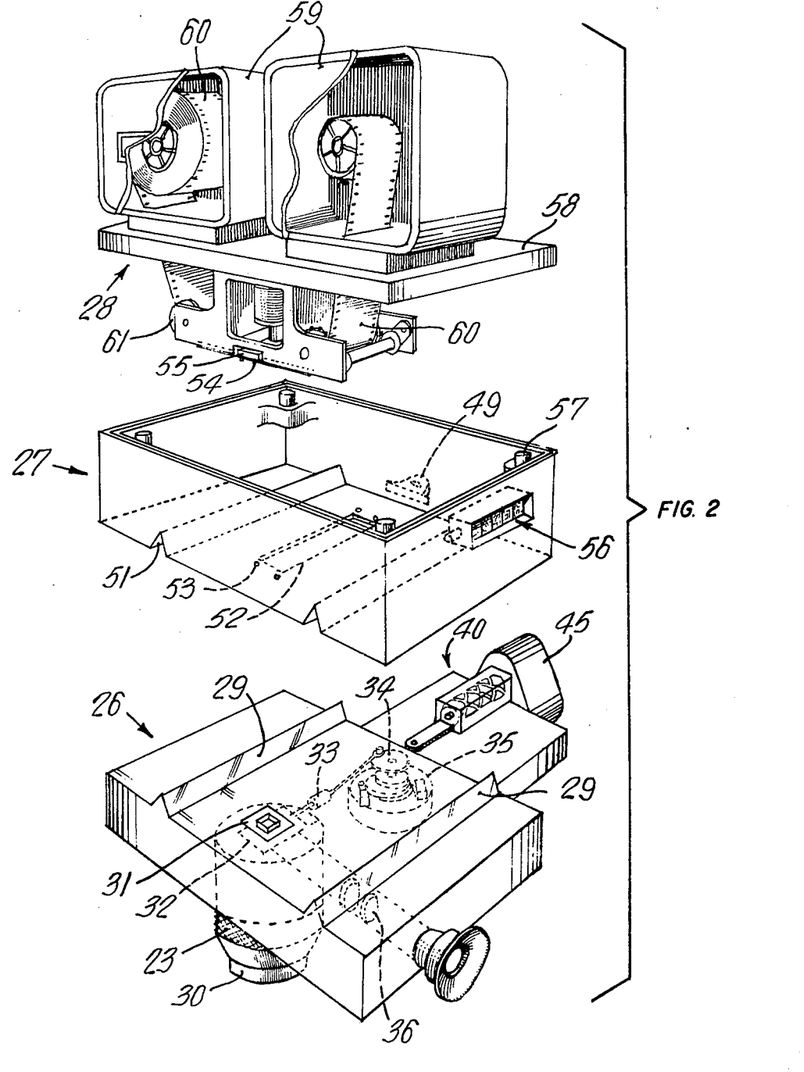
FIG. 2 is an exploded perspective view of the camera.
Figure 4:
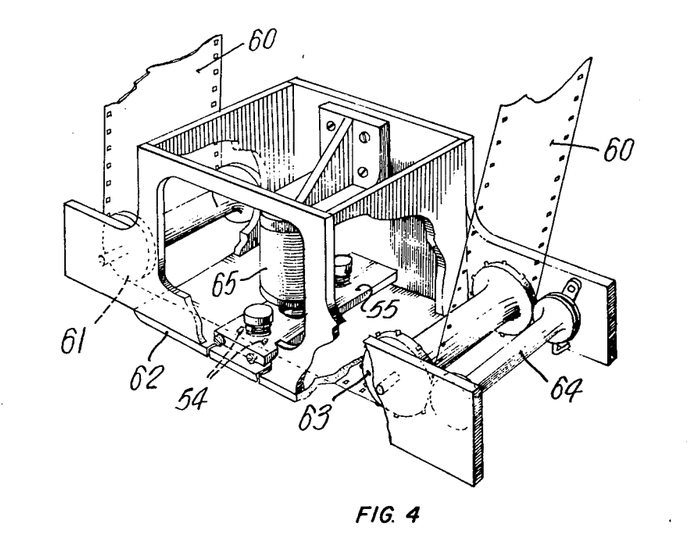
FIG. 4 is a fragmented perspective view of the film feed and registration module of the camera.

The camera 10 is made up of three basic units, and namely, the camera body 26, the sliding carriage 27 and the film feed and registration module 28. The module 28 and carriage 27 constitute a movable housing secured to the base or body 26. Referring now more particularly to FIGS. 2 and 4, the camera body 26 is made of a precision casting with raised guide rails 29 machined to a smooth and hardened polish. A high resolution apochromatic copying lens 30 is mounted on the bottom surface of the camera body 26. Within the body 26 and between a slightly protruding aperture frame 31 and the lens 30, is a sliding shutter 32 having a 45° mirror on its undersurface (not shown). This shutter 32 is connected via a linkage 33 to a cam 34 connected to a small step motor 35. In line with the mirror is an optical image magnifier 36 which is used for viewing and focusing. The electrical circuit is such that when the camera operation switch or shutter switch located on the control panel 13 is activated, the step motor 35 makes one revolution opening the shutter 32 for a short duration of time to allow an exposure, then closes the shutter 32 thereby returning the reflecting mirror (not shown) to its viewing and focusing position.

Figures 3, 3A:
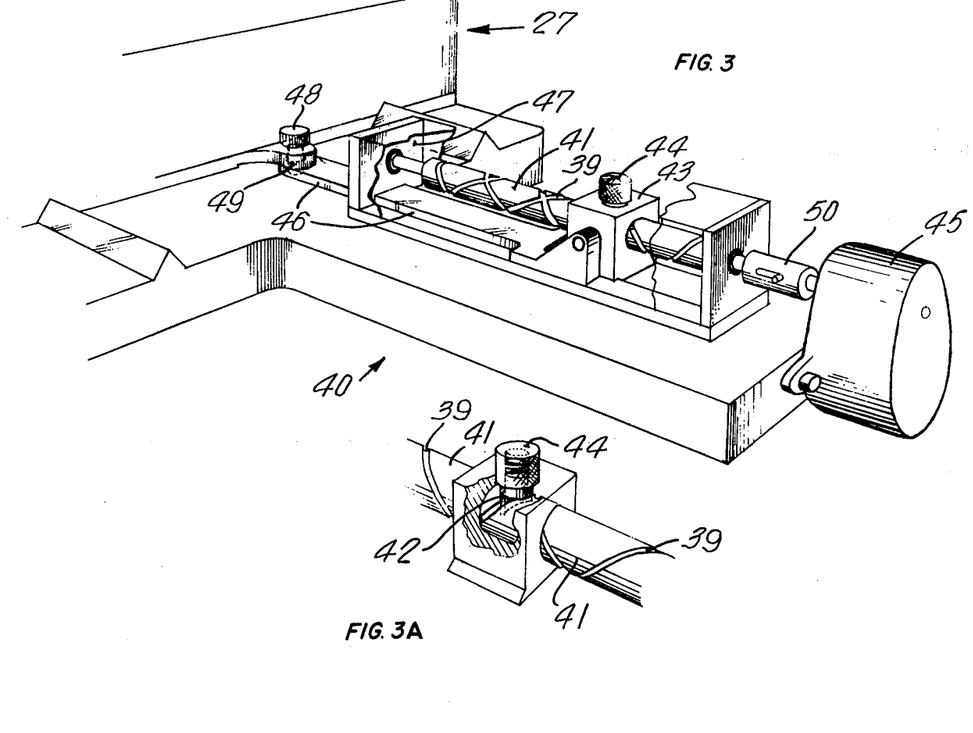
FIG. 3 is a fragmented perspective view of the programmer forming part of the camera body.
FIG. 3A is a perspective view of a portion of FIG. 3.

Located to the side of the camera body 26 is the helical sequential programmer 40 constituting a programming means for displacing the film and the camera. This programmer 40 is shown in detail in FIGS. 3 and 3A. Referring to FIG. 3, the programmer 40 consists of a drive member herein shown as a hardened steel, rod-like shaft 41 slotted with a helical thread 39, the pitch of which is 9.6 mm and which has a dwell at each end of the slot to facilitate the reversing action of the half-nut follower member 42 (shown in FIG. 3A) encased in a housing 43 and retained within the slot by a sprung knurled screw 44. There are six slotted threads on the helix, for each direction (right and left). The threaded shaft 41 is connected to a high torque step motor 45 of extreme precision, which makes one revolution whenever it is energised. This results in a movement of the half nut follower 42 within the housing 32 which is attached to linkage 46 which linkage slides through the end plate 47 in a lateral movement.

The linkage 46 is connected via a strong link pin 48 to lugs 49 on the side of the movable or sliding carriage 27. When the follower member 42 is stopped by the end plates 47, the helix 41 continues to revolve. This causes an additional small lateral movement (required to provide a dwell period) and necessitating a floating coupling 50 to be located between the helical sahft 41 and the drive shaft of the motor 45.

Referring now back to FIG. 2, the sliding carriage 27 has two guide grooves 51 cut and polished to fit precisely over guide rails 29, causing the sliding carriage 27 to move laterally (left to right, right to left) according to the direction that the helical programmer 40 is driving the follower 42 linked to the carriage 27 via linkage 46.

The sliding carriage 27 also has an aperture slot 52 which permits the carriage 27 to move laterally over the aperture frame 31 which protrudes from the camera body 26. At each end of aperture slot 52 there are clearance holes 53 which accept register pins 54 on the pressure plate 55 which is part of module 28. A counter mechanism 56 is attached to the front of the sliding carriage 27 and serves the purpose of informing the camera operator as to which stage of the sequential cycle has been reached. Set into each corner of the sliding carriage 27 are precisely fitted hardened and polished steel pins 57 which mate exactly with holes (not shown) in the mid-plate 58 on the underside of the film feed/registration module 28 and which permit the sliding carriage 27 and film module 28 to be locked together in perfect registration and constituting the movable module.

Referring now to the film feed/registration module 28, there are two film magazines 59 which sit within and are locked on the mid-plate 58, by latches (not shown). In actual use, and to facilitate film-loading the film feed/registration module 28 is unlocked from the sliding carriage 27 and laid on its side. The film magazine 59 with a supply of film 60 is locked onto the mid-plate 58 and the lead end of the film 60 pulled through a slot (not shown) on the mid-plate 58, brought over a film roller 61 across the film guide plate 62 engaging the sprocket pins 54 on either end of the film pressure plate 55 and continuing across the other part of the film guide plate 62 and between the sprocket wheel 63 and spring-loaded film retainer roller 64 up through the another slot (not shown) on the mid-plate 58 and attached to the take-up spool of another film magazine 59. Removable covers on the magazines 59 assist in performing these operations. The film pressure plate 55 is in the extended or "down" position, with the sprocket pins 54 engaged in the film sprocket holes. Just before the film/advance cycle, an electro-magnetic solenoid 65 attached to the film pressure plate 55 is automatically energised which retracts the film pressure plate 55 and withdraws the sprocket pins 54, allowing the film 60 to wind on the required distance. Upon completion of the film/advance cycle the electro-magnetic solenoid 65 is de-energised, bringing the film pressure plate 55 back to its normally engaged position and the sprocket pins 54 are again holding the film 60 in perfect alignment through the film sprocket holes.

In operation, the camera operator wishing to make a master grid of 48 images for further mass duplication prepares the required number of slides in proper sequence. After setting the field size and focusing through the reflex finder, he proceeds to expose the master on a special high resolution colour copy film as follows: Upon pressing the "expose/advance" button 70 (see FIG. 1), the shutter opens, withdrawing the 45° mirror mounted on its back and allowing the image rays from the lens to traverse the aperture to the film. The shutter at the "open" end of its travel contacts a micro-switch which activates the electronic flash exposing the image and the shutter then closes. Upon closing, the shutter contacts a second micro-switch which activates a motor that causes the helical programmer to make one turn, causing the sliding carriage to move to the right the proper distance. Changing slides and making successive exposures up to No. 6 bring the sliding carriage to the limit of its movement and the helix to its "dwell" position. At this point a limit micro-switch causes a second motor to wind the film forward and after photo No. 7 is exposed the helical programmer causes the sliding carriage to move left until the sequence of six photos on row 2 has been exposed. The sequence then repeats with odd numbered rows moving right and even numbered rows moving left. After row No. 8 has been run through, a cam on the counter mechanism automatically causes a row of film to advance for cutting purposes and then resets itself to number 1.

Referring now to the film 60 used in the camera, this film 60 is a special formulation colour film of high acutance and resolution, specially treated and processed to accurately duplicate transparencies from original colour transparencies of any size. The film 60 is 70 mm wide and has sprocket perforations of a special size and pattern for this camera. The images placed on the film 60 by the sequentially programmed camera 10 are 9.6 × 9.6 mm sq. separated by a blank border in the horizontal and vertical planes. The film 60 is exposed through the aperture frame 31 in the proper sequence. The image aperture at the focal plane is 9.6 × 9.6 mm. Although the camera could make image grids of indefinite length it is deemed most practical to consider a multislide consisting of a maximum of 48 images. Once processed and finished, a multislide film grid is then cut from the roll and is mounted in the plastic multislide mount 80 (see FIG. 5) consisting of interlocking mount members 81 and 82.

Figure 5:
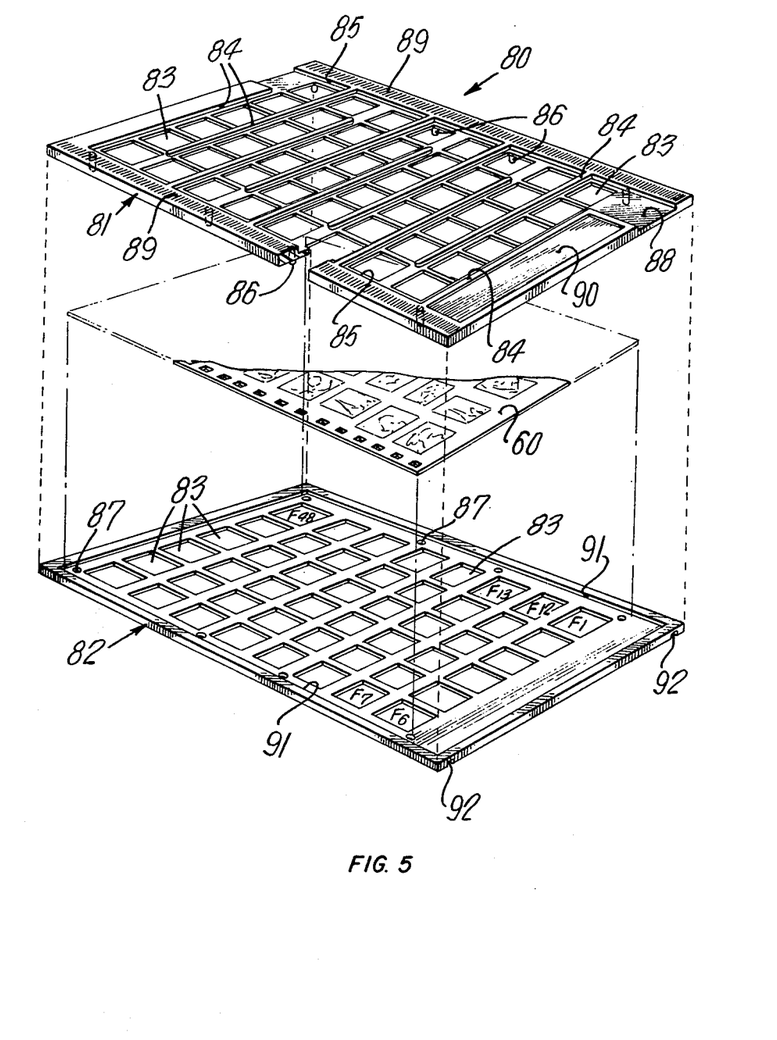
FIG. 5 is an exploded perspective view of the multi-image film mount.

The multislide mount members 81 and 82 are moulded out of a rigid plastic. Both members have 48 apertures 83 (9.6 × 9.6 mm) separated by horizontal ribs 84 and vertical ribs 85. The top member 81 has pins 86 on its underside placed at the first, third, fifth and eighth row of apertures on each side. These pins 86 engage in the sprocket holes of the film grid to accurately align the images in the multi-slide mount 80. The pins 86 of the top member 81 snap into corresponding openings 87 of the bottom member 82 and both members 81 and 82 are permanently sealed under pressure and sonic waves in a mounting machine (not shown). The top member 81 has moulded into its surface a recessed channel 88 which starts at the lower right hand side of top member 81 and upon reaching the first horizontal rib 84 extends to the left against image row F-1 to F-6. At image F-6 to F-7 the channel 88 continues and then turns right from image F-7 to F-12 where it again continues from image F-12 to F-13 and then turns left. This channel 88 continues its serpentine travel until it finds an exit at the top right side of top mount member 81.

As will be seen later when referring to FIGS. 6 to 8, this channel 88 guides the aperture member of the viewer or projector in the serpentine movement; the multi-slide mount 80 must follow in order to go from image No. F-1 to image No. F-48.

At each side of the top member 81 there is provided a ridge 89 having a fine series of horizontal raised teeth formed on the upper surface thereof to give a grip to the rubber O-ring wheels that will be used to drive the multi-slide mount 80 longitudinally in a north to south direction when it is being programmed through its movement cycle. Finally, in the lower wide border to top member 81 and running from just outside of the teeth 89 on the left side to just outside of the channel 88 on the right side, there is moulded a rectangular depression 90 to enable an identifying label to be placed in order to describe the subject matter contained in that particular multislide mount 80.

Referring now to the bottom member 82 of the multislide mount 80, as noted before, it has apertures 83 and holes 87 to receive the pins 86 of the top member 81. The bottom member 82 also has moulded into its upper side a rectangular depression 91. This depression 91 is centered on the apertures 88 and serves the purpose of accepting the cut piece of film 60 with images appearing on it. The film 60 being 0.05 mm thick is firmly held in place by both the pins 86 and the pressure of the top member 82 of the multislide mount 80. On the underside of the bottom member 82 there is moulded an aligning groove 92 on each side and spaced from each side of the bottom part 82. These grooves 92 serve the purpose of guiding the multislide mount 80 in its travel on the slide carrier of the viewer, which will be described later, and keeping it stable laterally.

Figure 6:
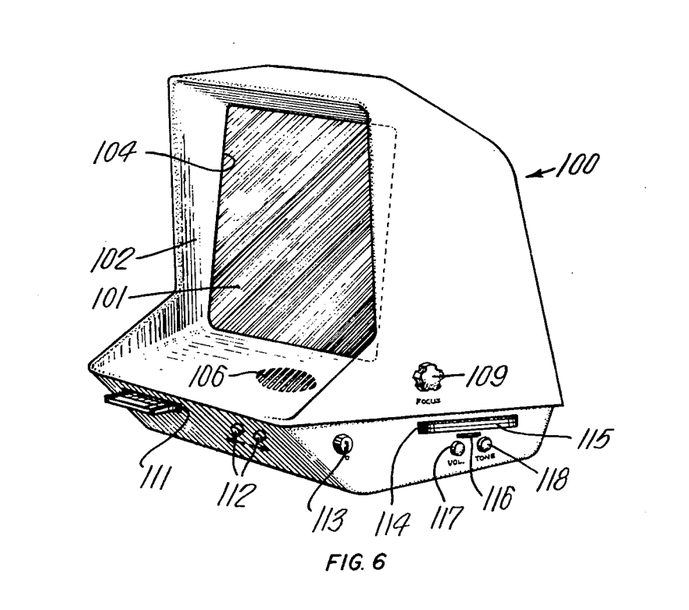
FIG. 6 is a perspective view of the viewer.
Figure 7:
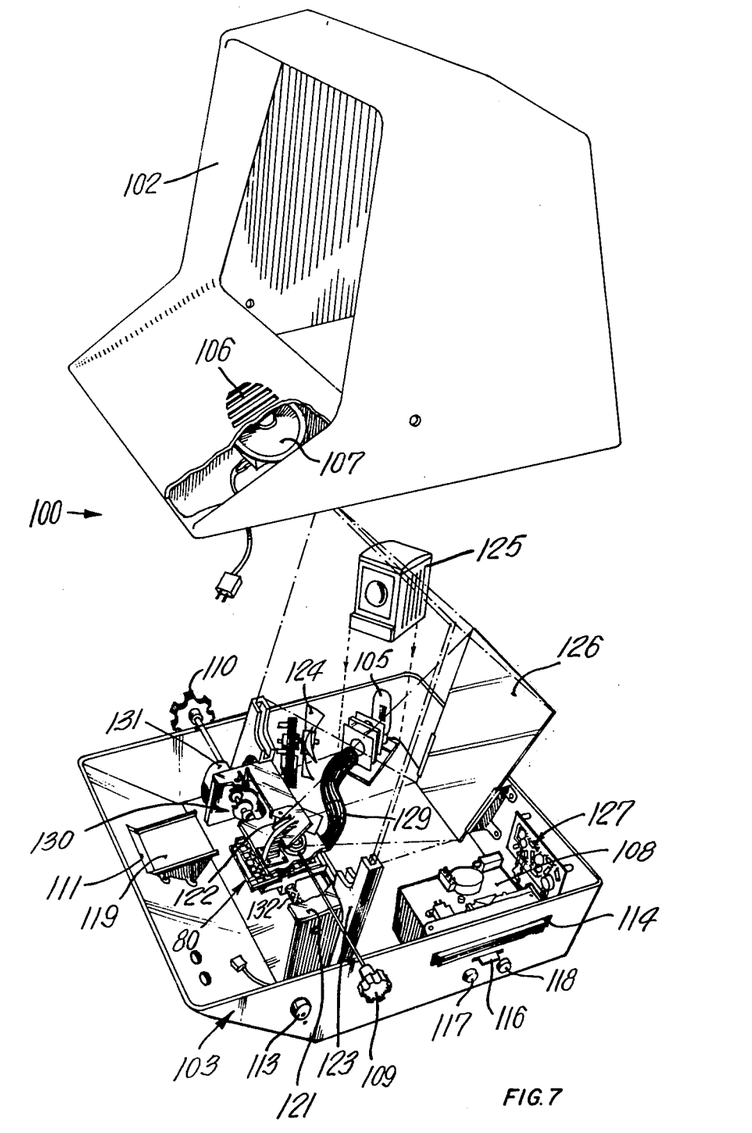
FIG. 7 is an exploded perspective view of the viewer.
Figure 8:
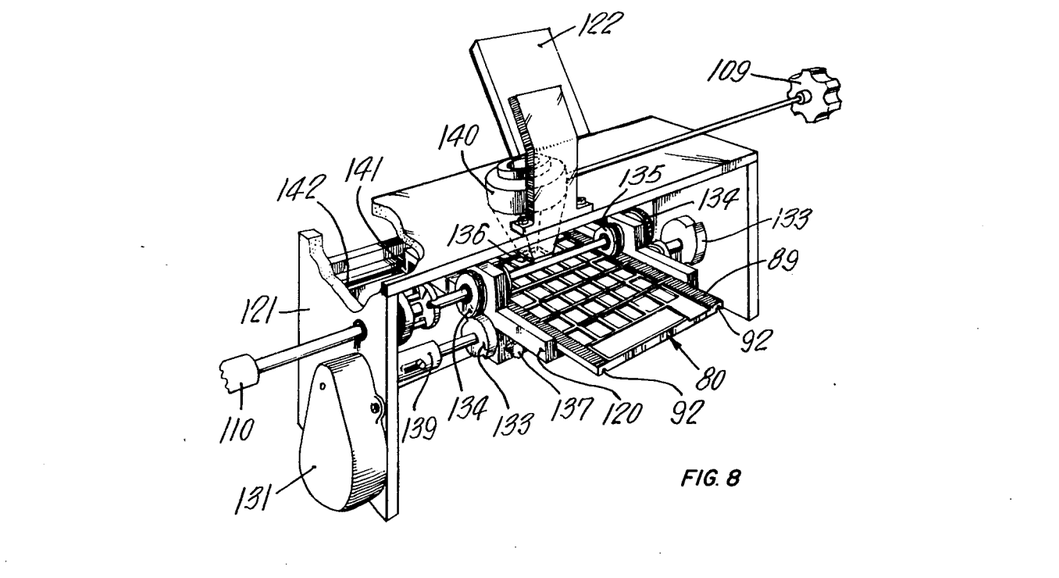
FIG. 8 is a fragmented perspective view of the slide programming and viewing mechanism.

Referring now to FIGS. 6 to 8, there is shown the multislide viewer 100. The viewer 100 is a rear-screen projection viewer which projects an image on the viewing screen 101. The screen 101 may be, for example, 8 × 8 inches square, with a surrounding hood 102 to shield the image from extraneous light. The body of the viewer 100 is formed of high-impact plastic and constructed of two parts, the hood 102 and the tray 103. The hood 102 in addition to its light shielding portion also has an aperture 104 to frame the screen 101. At the top of the hood 102 there is moulded a hand-grip (not shown) and vents (not shown) are provided on the back for the exhaustion of heat from the light source 105. Vertical slots in the form of an oval 106 are also cut-out into the hood 102 to act as an acoustic path for the audio speaker 107 which is mounted directly under this oval and connects to the cassette player 108. Protruding from the sides of the hood 102 are the focus knob 109 and "LOAD/UNLOAD" drive shaft with knob 110.

On the front left of the tray 103 there is provided a multislide mount loading/unloading slot 111. On the front right of the tray 103 there are also two manually operated pushbutton switches 112 used for programming the multislide mount 80 forward or reverse, as required, when automatic operation is not desired or available. At the right side, front of the tray 103 there is an ON/OFF switch 113, a slot 114 for loading a sound cassette 115 (the Phillips standard) a cassette reject bar 116, volume and tone controls 117 and 118 respectively, for the built-in cassette player 108.

FIG. 7 shows the general internal layout of the multislide viewer 100. Starting from the front of the tray 103 and directly behind the multislide load/unload slot 111 is a platform 119 which lines up directly with the slide carrier 120 when the slide carrier 120 has returned to the load/unload position. This platform 119 serves to position the multislide mount 80 once it is inserted in the load/unload slot 111. Proceeding towards the rear of the tray 103 we show the slide carrier 120 with its support framework 121 and a general view of its mechanism. Mounted on top of the support framework 121 is a small reflecting mirror on its mount 122 and the screen support channels 123 mounted on either side of the support framework 121. At the left middle of the tray is the blower fan 124 for cooling the light source 105 and its light cover 125. The rear mirror 126 mounted on the rear of the tray 103, the amplifier circuit board 127 and the cassette player mechanism 108 completes the inventory of components mounted on the inner walls of the tray 103. Directly in front of the light source and reaching underneath the aperture slot 128 of the slide carrier 120 is a cable of plastic fibre optics 129 of an appropriate diameter to track the light from the light source 105 to the aperture slot 128 (see FIG. 8A) of the slide carrier 120 without any heat. This serves to keep the images from going out of focus through heat expansion. Also mounted on the top of the carrier support framework 121 and to the left of the mirror support is a small, thin shutter mechanism 130, linked via rod and cam (not shown in detail) to the motor 131. This shutter mechanism 130 serves to blank out the screen 101 during image-changing and smoothes the transition from image to image.

Figure 8A:
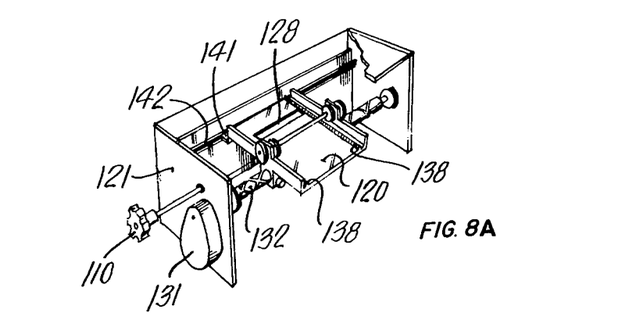
FIG. 8A is a fragmented perspective view of the slide mount programmer.

The operation of the multislide viewer 100 is similar in concept to that of the camera 10. Both are based upon the use of the helical drive as a programmer, the camera 10 to make the film pattern, the viewer 100 to "read" or view the pattern created by the camera 10. In actual use, the multislide mount 80 is inserted in the load/unload slot 111 of the multislide viewer 100 until it comes to a stop. At this point the user turns the load-/unload knob 110 from front to back. This transports the multislide mount 80 to another fixed stop inside the viewer 100 where image No. F-1 is now ready to be guided into the optical path for viewing. When the cassette 115 starts to play, a pulsed signal on the second audio track is transmitted to cause the motor 131 to rotate and the helical programmer 132 to revolve once. The programmer 132 is a rod-like member having two helical slots on its outer surface. The eccentric disc 133 engages a wheel 134 with an O-ring member to which is connected by means of a shaft to another wheel 135 with an O-ring member driving directly on the teeth 89 of the multi-image slide mount 80 causing the mount 80 to be displaced. The movement is stopped by the aperture guide 136 of the slide carrier 120 coming in contact with a channel wall 88 and the eccentric disc 133 becoming disengaged with the wheel 134 as it begins its horizontal travel across the helical programmer 132. Each time the pulse activates the motor drive, the helical programmer 132 rotates on a slotted pin or follower member (not shown but similar to the follower member 42 in the camera). This causes the slide carrier 120 on which the pin housing 137 is attached, to move to left or right, depending on the direction it is being driven by the helical programmer 132. The aperture guide 136 rides between the channel walls 88 or guide ribs 84 and 85 and when reaching either end (ribs 85) of the multislide mount 80 the eccentric discs 133 at either end of the helical programmer 132 engage and disengage with the O-ring member on the wheels 134 to drive the multislide mount 80 forward. This arrangement constitutes the slide engaging means of the viewer. (For reverse operation, the programmer 132 merely needs to be driven in reverse by the bi-directional motor 131). The V grooves 92 in the multislide mount ride on raised V rails 138 on the slide carrier 120. At the end of the slide program, when the slide 80 has reached image No. 48, the final movement of the programmer 132 causes the multislide mount 80 to eject slightly from the loading slot 111 so that the user may remove it and insert another program.

Other details shown in FIGS. 8 and 8A include the floating coupling 139 between helical programmer 134 and motor 131, the spring loaded and slotted LOAD-/UNLOAD drive shaft 110 which automatically raises the aperture guide 136 so that it clears the channel walls until the multislide mount 80 has come to a full stop in the load or unload position.

The lens 140 is contained within the walls of the aperture guide 136 and can move up and down within a fixed distance by means of a cam and pin (not shown) on the focusing knob 109. This allows fine focusing adjustment but the lens cannot be removed accidentally from its position in the aperture guide. For stabilising purposes, an extension 141 on the slide carrier 120 rides along an "OILON", trademark, bearing plastic insert 142 on the rear wall of the support framework 121. The slide carrier 120 has, towards its rear and behind the pulleys 134 and 135, an aperture slot 128 slightly larger in width and length of a row of six horizontal images on a multislide mount 80. This allows each image in turn to be positioned directly in line with the fibre optic cable 129 reaching the light source 105 and lens 140 of the viewer. All running surfaces are mounted in OILON self-lubricating bearings for smooth, frictionless operation. Both mirrors 122 and 126 are surface coated with aluminised coating.

I claim:

1. A multi-image slide mount comprising a plate-like body having at least two adjacent rows of opposed apertures therein; said plate-like body being adopted to receive and secure a film strip having images thereon in alignment with said apertures; guide means on a face of said body extending sequentially about said apertures for providing a guide channel, said guide means comprising a raised elongated guide rib adjacent each side of said rows of apertures and a raised transverse rib adjacent each end of said rows of apertures; said elongated ribs alternately extending transversely from one of said transverse ribs and the other of said transverse ribs and terminating in a free end at a point spaced from one or the other of said transverse ribs to provide said guide channel between said ribs and between opposed apertures at one end of said adjacent rows of apertures.

2. A multi-image slide mount as claimed in claim 1, wherein the spacing between said elongated guide ribs and between said free ends of said elongated ribs and said transverse ribs is substantially equal.

3. A multi-image slide mount as claimed in claim 1, wherein said plate-like body is formed of two juxtaposed plate-like members each having a plurality of corresponding apertures therein, and including interlocking means in each said plate-like members for locking said members together.

4. A multi-image slide mount as claimed in claim 3, wherein one of said plate-like members is provided with a rectangular depression for receiving a film strip therein.

5. A multi-image slide mount as claimed in claim 1, wherein said plate-like body is substantially rectangular and said rows of apertures extend transversely to the longitudinal axis of said body and include an elongated ridge on each side of said body parallel to said longitudinal axis.

6. A multi-image slide mount as claimed in claim 1, wherein there is further provided at least one aligning groove in a face of said body for guiding of said slide mount.

* * * * *